US005852861A

United States Patent [19]

Cunningham et al.

[11] Patent Number: 5,852,861

[45] Date of Patent: Dec. 29, 1998

[54] SIPPER TUBE INSERTION AND REMOVAL APPARATUS

[75] Inventors: J. James Cunningham, Stafford; Dewitt C. Priddy, The Woodlands, both of Tex.; Gary B. Bunney, Joppa, Md.; Ronald W. Hardesty, Belair, Md.; William M. Marston, Conowingo, Md.

[73] Assignee: Lab Products, Inc., Seaford, Del.

[21] Appl. No.: 683,450

[22] Filed: Jul. 15, 1996

[51] Int. Cl.[6] ...................................................... B23P 19/04

[52] U.S. Cl. .................................. 29/234; 29/235; 29/251

[58] Field of Search .............................. 29/282, 251, 234, 29/235, 283, 281.5, 267

[56] References Cited

U.S. PATENT DOCUMENTS

| | | | |
|---|---|---|---|
| 1,428,303 | 9/1922 | Seeberg | 29/251 |
| 1,512,422 | 10/1924 | Hatcher et al. | 29/251 |
| 2,184,356 | 12/1939 | Lindgren | 29/251 |
| 2,813,330 | 11/1957 | Schmerheim | 29/282 |
| 2,814,098 | 11/1957 | Kessell | 29/282 |
| 4,305,195 | 12/1981 | Gould | 29/251 |
| 4,473,932 | 10/1984 | Widner | 29/251 |
| 4,564,989 | 1/1986 | Sogandares | 29/235 |
| 4,584,752 | 4/1986 | Fuentes | 29/234 |
| 5,490,321 | 2/1996 | Kaneko | 29/235 |

*Primary Examiner*—Robert C. Watson

*Attorney, Agent, or Firm*—Stroock & Stroock & Lavan LLP

[57] ABSTRACT

A sipper tube insertion and removal apparatus is provided for easily and consistently inserting a sipper tube into a stopper with a hole and for also easily and consistently removing a sipper tube from a hole in a stopper. For insertion of a sipper tube into the hole of a stopper, the apparatus includes a sipper tube insertion head for holding the sipper tube, a stopper insertion platform for holding the stopper, and an actuator. The stopper insertion platform holds the stopper such that the hole of the stopper is aligned with the sipper tube, and the platform is disposed at a predetermined distance apart from the sipper tube insertion head. The actuator closes the predetermined distance between the sipper tube insertion head and the stopper insertion platform so as to cause the sipper tube to be inserted into the hole of the stopper. For removing a sipper tube from a hole in a stopper, the apparatus includes a sipper tube removal bit, a stopper removal platform for holding the stopper with the sipper tube inserted in the hole of the stopper, and an actuator. The stopper removal platform is disposed at a predetermined distance apart from the sipper tube removal bit, and the actuator closes the predetermined distance between the sipper tube removal bit and the stopper removal platform so as to drive the sipper tube removal bit into the hole of the stopper to thereby push the sipper tube out of the hole of the stopper.

32 Claims, 8 Drawing Sheets

SIPPER TUBE INSERTION AND REMOVAL APPARATUS

BACKGROUND OF THE INVENTION

This invention relates generally to a sipper tube insertion and removal apparatus, and more particularly to an apparatus which inserts sipper tubes into stoppers and which also removes sipper tubes from stoppers.

Animal cages are typically provided with an arrangement for supplying water and/or other liquids to an animal within the cage. Very often, this arrangement includes a bottle for storing and/or delivering a supply of liquid. Within the cage, the bottle is capped with a stopper which is provided with a hole. A sipper tube passes through the hole in the stopper to deliver the liquid to the mouth of the animal.

The stopper acts to prevent the liquid in the bottle from being released uncontrollably into the cage, while the sipper tube provides a means for dispensing a controlled flow of water to the animal through the stopper. The stopper must be sufficiently resilient to allow it to be compressed for ensuring a tight, leak proof seal against the mouth of the bottle or hose into which the stopper is inserted, as well as a tight, leak-proof seal against the outer walls of the sipper tube which is inserted through the hole of the stopper. However, the stopper must also be sufficiently firm to ensure that these leak-proof seals are not compromised by either the force of the water behind the stopper or by forces placed on the sipper tube or the stopper by the animal within the cage.

Accordingly, a sipper tube must be inserted into a stopper to assemble the appropriate dispenser for the liquid supply. Moreover, the sipper tube must also be periodically removed from and reinserted into the stopper. Specifically, a sipper tube should be removed from a stopper for proper cleaning and sanitization of both the sipper tube and the stopper, and the sipper tube should then be reinserted into the stopper for further use. This cleaning is important not only for continued use of the sipper tube and stopper assembly by a single animal within a single cage, but is especially important if the assembly is to be reused for other animals because of the risk of contamination from one animal or cage to the next to prevent animal contamination.

Inserting a sipper tube into a stopper is conveniently accomplished by hand and is difficult for two reasons. First, while the material comprising the stopper is resilient, it is also very firm and durable as described above. Second, to form the leak-proof seal described above, the stopper hole diameter is smaller than the tube diameter to provide a sufficient tension fit. Therefore, the material requires a significant degree of force to compress or stretch the hole. Because the sipper tube is inserted through the hole in the stopper, the wall of this hole must be expanded radially in all directions, which requires more force than if the hole were to be simply deformed laterally, for instance. Removing a sipper tube from a stopper is similarly difficult. In particular, the radially expanded stopper material exerts a significant compressive force on the walls of the sipper tube thus creating a substantial resistance to efforts to pull the sipper tube out of the stopper.

Conventionally, sipper tubes have been inserted into and removed from stoppers manually. Given the significant force needed for insertion and removal of sipper tubes as described above, this task is difficult, strenuous and time consuming.

Accordingly, it is desired to provide an apparatus which facilitates the insertion and removal of sipper tubes from stoppers and which reduces the hazards caused by manual insertion and removal of sipper tubes.

SUMMARY OF THE INVENTION

A sipper tube insertion and removal apparatus is provided for easily and consistently inserting a sipper tube into a stopper with a hole and for also easily and consistently removing a sipper tube from a hole in a stopper. For insertion of a sipper tube into the hole of a stopper, the apparatus includes a sipper tube insertion head for holding the sipper tube, a stopper insertion platform for holding the stopper, and an actuator. The stopper insertion platform holds the stopper such that the hole of the stopper is aligned with the sipper tube, and the platform is disposed at a predetermined distance apart from the sipper tube insertion head. The actuator closes the predetermined distance between the sipper tube insertion head and the stopper insertion platform so as to cause the sipper tube to be inserted into the hole of the stopper. For removing a sipper tube from a hole in a stopper, the apparatus includes a sipper tube removal bit mounted to the stopper insertion platform, and a stopper removal platform for holding the stopper with the sipper tube inserted in the hole of the stopper. The stopper removal platform is disposed at a predetermined distance apart from the sipper tube removal bit, and the actuator closes the predetermined distance between the sipper tube removal bit and the stopper removal platform so as to drive the sipper tube removal bit into the hole of the stopper to thereby push the sipper tube out of the hole of the stopper.

Accordingly, it is an object of this invention to provide an improved sipper tube insertion and removal apparatus.

Another object of this invention is to provide a sipper tube insertion and removal apparatus which facilitates the insertion and removal of a sipper tube from a stopper.

A further object of this invention is to provide a sipper tube insertion and removal apparatus which reduces the hazards caused by manual insertion and removal of a sipper tube from a stopper.

A still further object of this invention is to provide a sipper tube insertion and removal apparatus which permits a sipper tube to be inserted and removed from a stopper rapidly and efficiently.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
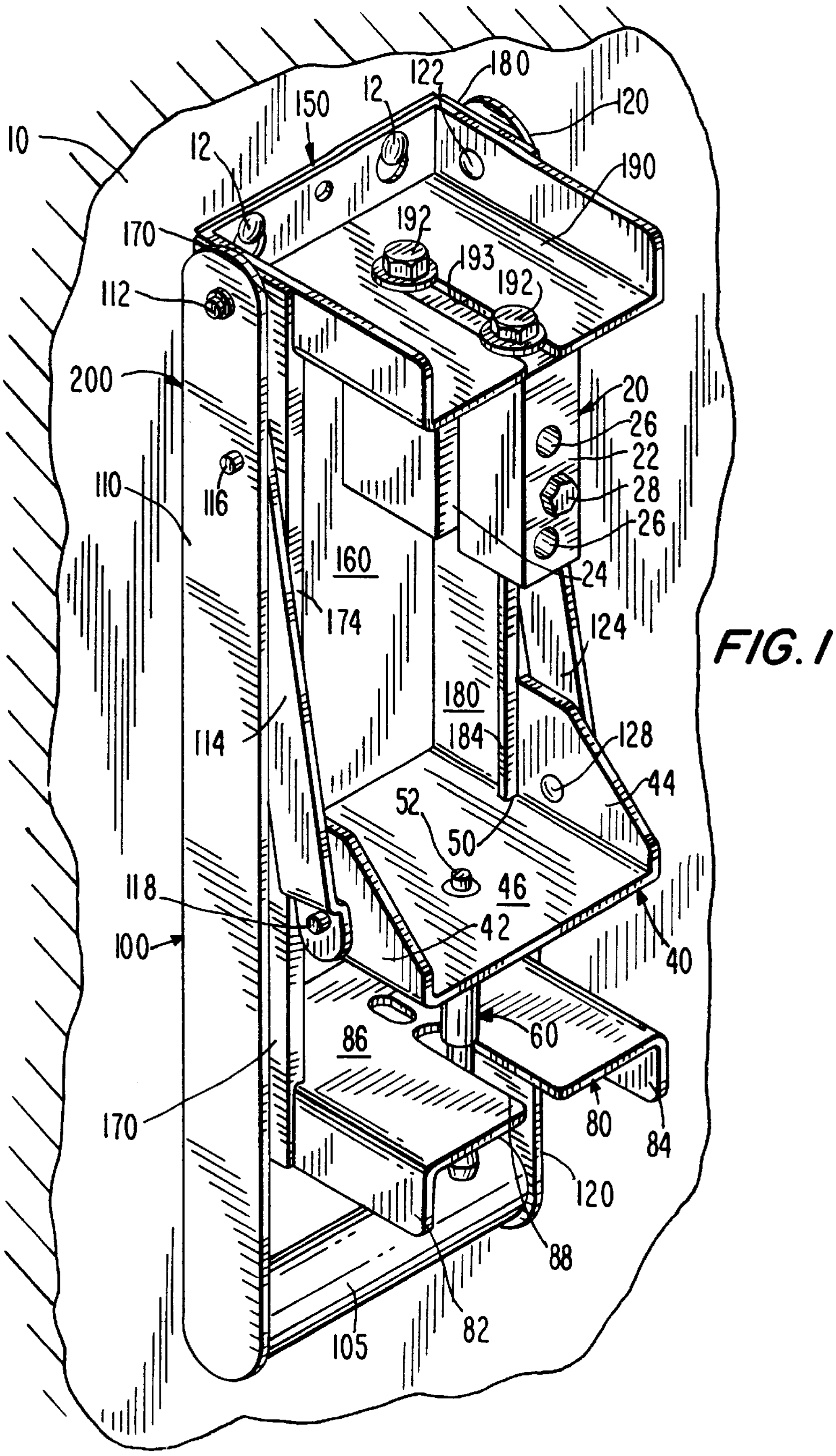
FIG. 1 is a perspective view of a sipper tube insertion and removal apparatus according to the present invention.

As shown in FIG. 1, a sipper tube insertion and removal apparatus generally indicated at 200, includes a frame generally indicated as 150, with a sipper tube insertion head generally indicated as 20, a stopper insertion platform generally indicated as 40, a sipper tube removal bit generally indicated as 60, a stopper removal platform generally indicated as 80, a stopper release plate generally indicated as 130, and an actuator generally indicated as 100 mounted thereon.

Figure 2:
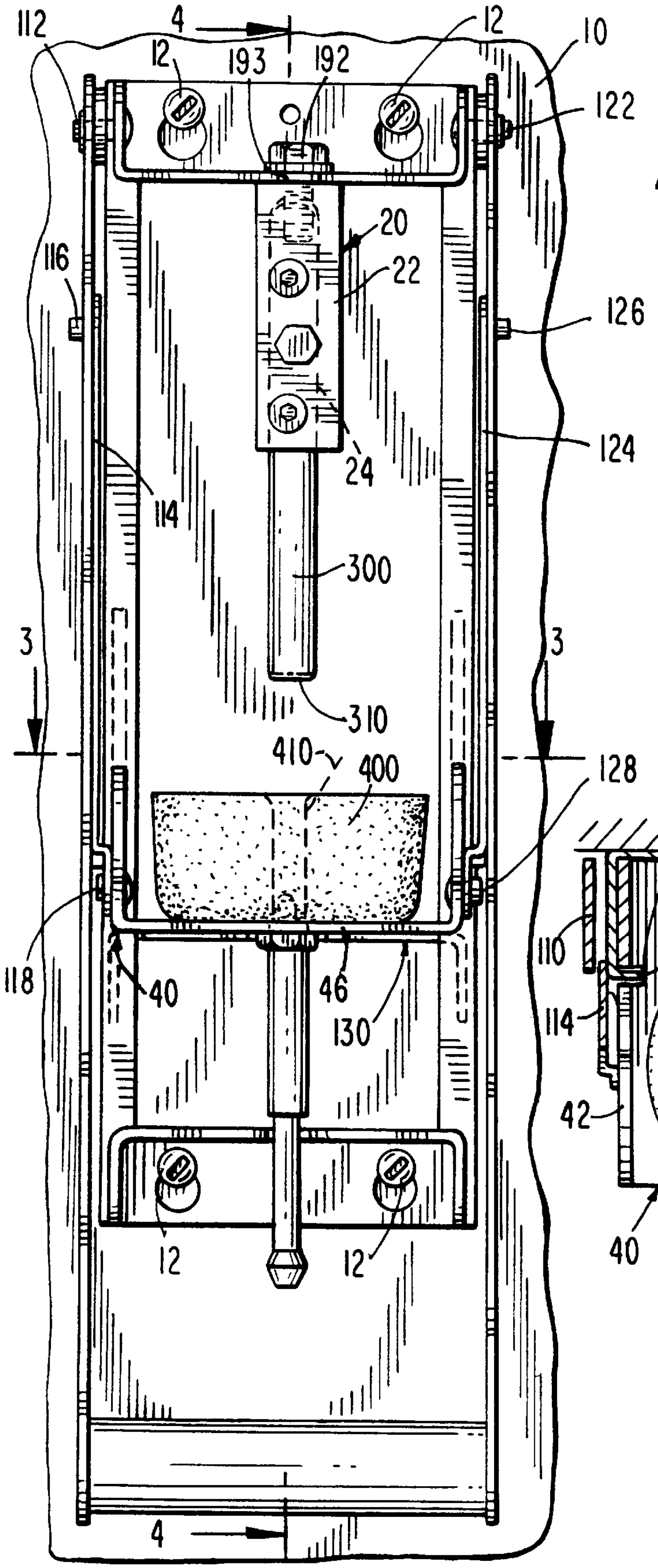
FIG. 2 is a front elevational view of a sipper tube insertion and removal apparatus according to the present invention positioned to insert a sipper tube into a stopper.

Frame 150 preferably includes a back panel 160, side panels 170 and 180 attached generally perpendicularly to back panel 160, and a top panel 190 attached generally perpendicularly to back panel 160, side panel 170 and side panel 180. These panels are preferably comprised of a strong metal, such as stainless steel, and are preferably attached to one another by welding. As shown in FIGS. 1 and 2 in particular, frame 150 is preferably mounted to a vertical surface 10 using screws 12.

As shown in FIGS. 1, 2, 4 and 5, sipper tube insertion head 20 is mounted to top panel 190 of frame 150. Sipper tube insertion head 20 preferably comprises a block 22 provided with a substantially linear groove 24 for holding a sipper tube 300. Block 22 is preferably constructed of metal. Groove 24 is generally U-shaped in horizontal cross-section and is appropriately sized so as to snugly accommodate a sipper tube 300 placed lengthwise within groove 24. Groove 24 is also preferably provided with one or more U-shaped rings (not shown) made of rubber or other resilient material into which a sipper tube 300 may be pressed so that sipper tube 300 may be held securely, though not tightly, within groove 24 of insertion head 20.

Sipper tube insertion head 20 is preferably provided with one or more sipper tube length adjuster holes 26 for adjusting sipper tube insertion head 20 to accept sipper tubes of various lengths which might otherwise not achieve proper insertion. For example, a shorter sipper tube than that shown in FIG. 4 (i.e. shorter than the length of groove 24) may be required. In such a case, as the tube is forced into the stopper, there is a tendency to merely push the sipper tube upwards and further into groove 24 without achieving full insertion of the sipper tube into the hole of the stopper. To accommodate these shorter sipper tubes, a screw, bolt, dowel or other suitable barrier 28 is inserted through one of the sipper tube length adjuster holes 26 and into groove 24 at the appropriate level, effectively shortening groove 24 and preventing excess upward movement of a sipper tube which thereby permits a stopper to be forced onto a sipper tube of any length. Each sipper tube insertion head 20 can be provided with a groove 24 with a width selected to accommodate sipper tubes of a particular width, and with sipper tube length adjuster holes 26 at various positions to accommodate sipper tubes of various particular lengths. Moreover, the groove 24 of sipper tube insertion head 20 can be substantially linear as described above, or may alternatively be disposed in other configurations to accommodate sipper tubes of other shapes. For example, groove 24 may be arcuate or angular to accommodate rounded or bent sipper tubes, respectively. Sipper tube insertion head 20 is preferably detachably bolted to top panel 190 using one or more bolts 192 so that sipper tube insertion head 20 is removably affixed to top panel 190. Bolts 192 are inserted through a groove 193 in top panel 190, allowing for movement away from and towards back panel 160 as needed or for removal of sipper tube insertion head 20 entirely for maintenance.

As also shown in FIGS. 1,2,4 and 5, actuator 100 includes a first lever member 110 pivotably mounted to side panel 170 of frame 150 about a shaft 112 mounted to side panel 170. Likewise, a second lever member 120 is pivotably mounted to side panel 180 of frame 150 about a shaft 122. The ends of lever members 110 and 120 opposite shafts 112 and 122 are joined by a handle 105. A first pivoting strut 114 is coupled to lever member 110 by a pin 116. A second pivoting strut 124 is coupled to lever member 120 by a pin 126.

As shown in FIGS. 1–5, stopper insertion platform 40 includes a base 46 and two side walls 42 and 44. Side wall 42 is pivotably joined to pivoting strut 114 by a pin 118. The end of pivoting strut 114 opposite pin 118 is pivotably joined to lever member 110 by pin 116. Similarly, side wall 44 is pivotably joined to pivoting strut 124, preferably using a pin 128. The end of pivoting strut 124 opposite pin 128 is pivotably joined to lever member 120 by pin 126. Base 46 of stopper insertion platform 40 is provided generally perpendicular to back panel 160 of frame 150 and is further provided with guide notches 48 and 50 for slidably accepting rails 174 and 184 disposed on side members 170 and 180 of frame 150 respectively. In an exemplary embodiment, base 46 may also be provided with a stopper alignment nib 52 which is disposed below and in vertical alignment with groove 24 of sipper tube insertion head 20.

Figure 4:
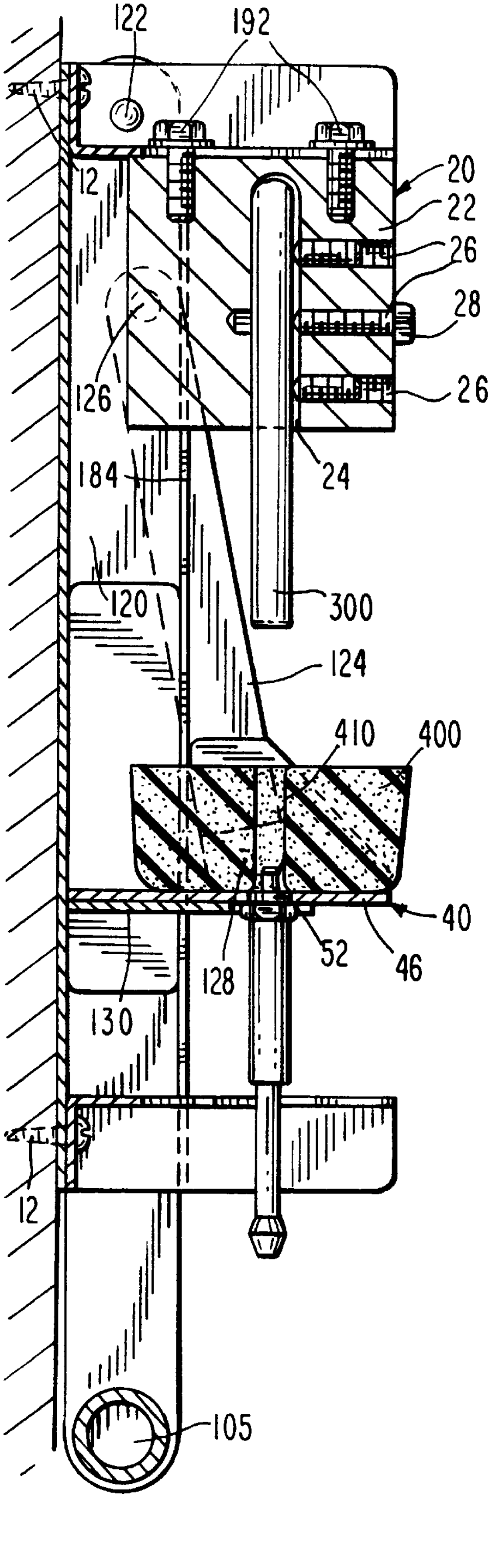
FIG. 4 is a sectional view taken along the line 4—4 of FIG. 2.
Figures 5, 6:
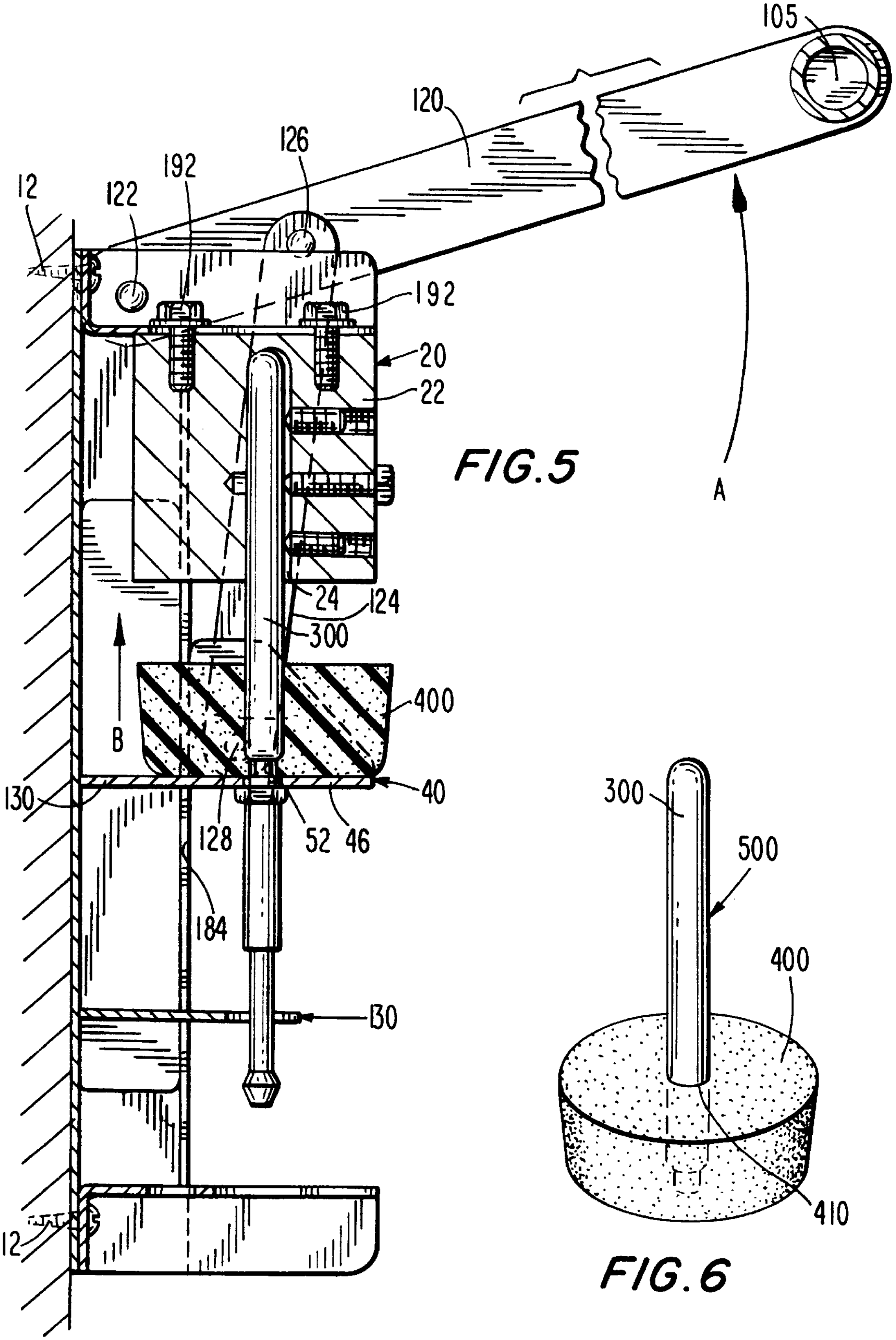
FIG. 5 is a sectional view of a sipper tube insertion and removal apparatus according to the present invention taken along the line 4—4 of FIG. 2 showing insertion of a sipper tube into a stopper in accordance with an invention.
FIG. 6 is a perspective view of a sipper tube inserted in a stopper.

Reference is now more particularly made to FIGS. 4 and 5. As can be seen, when handle 105 is pulled forward (that is, away from mounting surface 10) and raised toward top panel 190 in the direction of arrow A (FIG. 5), lever members 110 and 120 pivot about pins 112 and 122 and simultaneously raise pins 116 and 126 joined to pivoting struts 114 and 124. Pivoting struts 114 and 124 in turn raise stopper insertion platform 40 in the direction of arrow B (FIG.5) by virtue of pins 118 and 128 connected to side walls 42 and 44 respectively of stopper insertion platform 40. Thus, stopper insertion platform 40 slides along rails 174 and 184 towards sipper tube insertion head 20. Rails 174 and 184 also maintain stopper insertion platform 40 substantially perpendicular to back panel 160. Stopper insertion platform 40 therefore remains substantially horizontal when frame 150 is mounted to a vertical surface 10 by virtue of the guiding action of rails 174 and 184 within notches 48 and 50 respectively.

Figure 3:
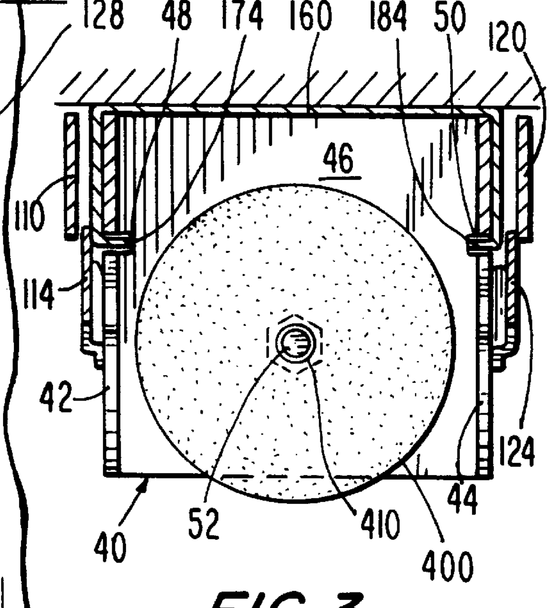
FIG. 3 is a sectional view taken along the line 3—3 of FIG. 2.

To insert a sipper tube 300 into a hole 410 in a stopper 400, a sipper tube 300 is inserted into groove 24 of sipper tube insertion head 20. A sufficient length of sipper tube 300 must extend below block 22 to allow sipper tube 300 to be inserted to the desired depth into hole 410 of stopper 400. Stopper 400 is then placed on stopper insertion platform 40 as shown in FIGS. 2–4. Hole 410 of stopper 410 is placed atop stopper alignment nib 52 such that stopper alignment nib 52 extends partially into 410 and thereby aligns hole 410 with sipper tube 300 directly above. Next, as shown in FIG. 5, handle 105 of actuator 100 is pulled forward and raised in the direction of arrow A to lift stopper insertion platform 40 in the direction of arrow B toward stopper insertion head 20 with enhanced leverage, and to thereby lift stopper 400 toward the stationary sipper tube 300. Accordingly, as handle 105 of actuator 100 is raised, sipper tube 300 is inserted into hole 410 of stopper 400. Handle 105 of actuator 100 is raised until sipper tube 300 has been inserted to a desired depth within hole 410 of stopper 400. When the desired insertion depth has been attained, handle 105 is lowered to lower stopper insertion platform 40, and sipper tube 300 may then be removed from groove 24 of insertion head 20, resulting in the desired sipper tube and stopper assembly 500 shown in FIG. 6.

Actuator 100 provides enhanced leverage for inserting sipper tube 300 into a hole 410 within stopper 400. In particular, lever members 110 and 120 are pivoted when handle 105 is pulled forward and raised, which lifts pivoting struts 114 and 124 and stopper insertion platform 40 at pins 116 and 126. By providing pins 116 and 126 near the pivoting points 112 and 122 of lever members 110 and 120, relatively little force need be exerted in lifting handle 105 in order to apply substantial force in lifting a stopper on platform 40 onto a sipper tube in insertion head 20. Accordingly, the enhanced leverage provided by actuator 100 in conjunction with the arrangement of insertion head 20 and stopper insertion platform 40 enables an operator to easily and consistently insert sipper tube 300 into hole 410 of stopper 400. Moreover, since the operator operates only handle 105 of actuator 100 during the insertion process, the risk of injury to the operator is reduced because the operator's hands are kept away from the sipper tube and the stopper themselves.

Reference is now made to FIGS. 1 and 7–11, wherein sipper tube removal bit 60, stopper removal platform 80 and stopper release bar 130 will be described in detail. These features, together with actuator 100, enable an operator to easily remove a sipper tube from a stopper.

Sipper tube removal bit 60 is mounted to a slidable support, preferably to the underside of stopper insertion platform 40 using a nut 62 so as to be moveable with stopper insertion platform 40 in conjunction with actuator 100 as described above. Sipper tube removal bit 60 preferably comprises a cylindrical shoulder 64 adjoining a neck 66 and terminating in a conical or frustoconical head 68. Neck 66 is preferably narrower in width than hole 410 in stopper 400, and is longer than the depth of hole 410 within stopper 400. Head 68 has a flare 70, which forms structure having the maximum width of head 68, and a tapered tip 72 for easy insertion into hole 410. Flare 70 has a width such that, when tip 72 is inserted into the end of a sipper tube, flare 70 cannot pass into the sipper tube and instead contacts the round end 310 of sipper tube 300. Flare 70 is also preferably no wider than necessary to contact end 310 of sipper tube 300. Head 68 is also preferably provided with a tapered section 74 adjoining neck 66. Further, in the preferred embodiment, sipper tube removal bit 60 passes through base 46 of stopper insertion platform 40 such that stopper alignment nib 52 comprises the top end of sipper tube removal bit 60.

Stopper removal platform 80 is mounted to frame 150 below stopper insertion platform 40, preferably by welding to back panel 160 and/or side panels 170 and 180. Stopper removal platform 80 comprises a base 86 with a centrally provided slot 88 for receiving a sipper tube perpendicular to base 86. Slot 88 is at least as wide as the diameter of a sipper tube but is narrower than the diameter of a stopper. Further, slot 88 is preferably provided with a U-shaped end 90 positioned such that the hole of a sipper tube inserted into slot 88 against end 90 is directly beneath tip 68 of sipper tube removal bit 60. Stopper removal platform 80 may 20 also comprise side walls 82 and 84 for improved stability in mounting to frame 150.

Stopper release plate 130 is mounted to frame 150 between stopper removal platform 80 and head 68 of sipper tube removal bit 60 at its position of furthest extension away from stopper removal platform 80. Stopper release plate 130 is preferably mounted to frame 150 by welding to back panel 160 and/or side panels 170 and 180. Moreover, stopper release plate 130 is mounted a sufficient height above stopper removal platform 80 to provide sufficient clearance for a stopper to be inserted widthwise between stopper removal platform 80 and stopper release plate 130. Stopper release plate 130 comprises a base 136 with a centrally provided hole 138 permitting movement of sipper tube removal bit 60 therethrough. Accordingly, hole 138 is at least as wide as the widest portion of sipper tube removal bit 60 which passes therethrough, but is narrower than the diameter of a stopper.

Figure 7:
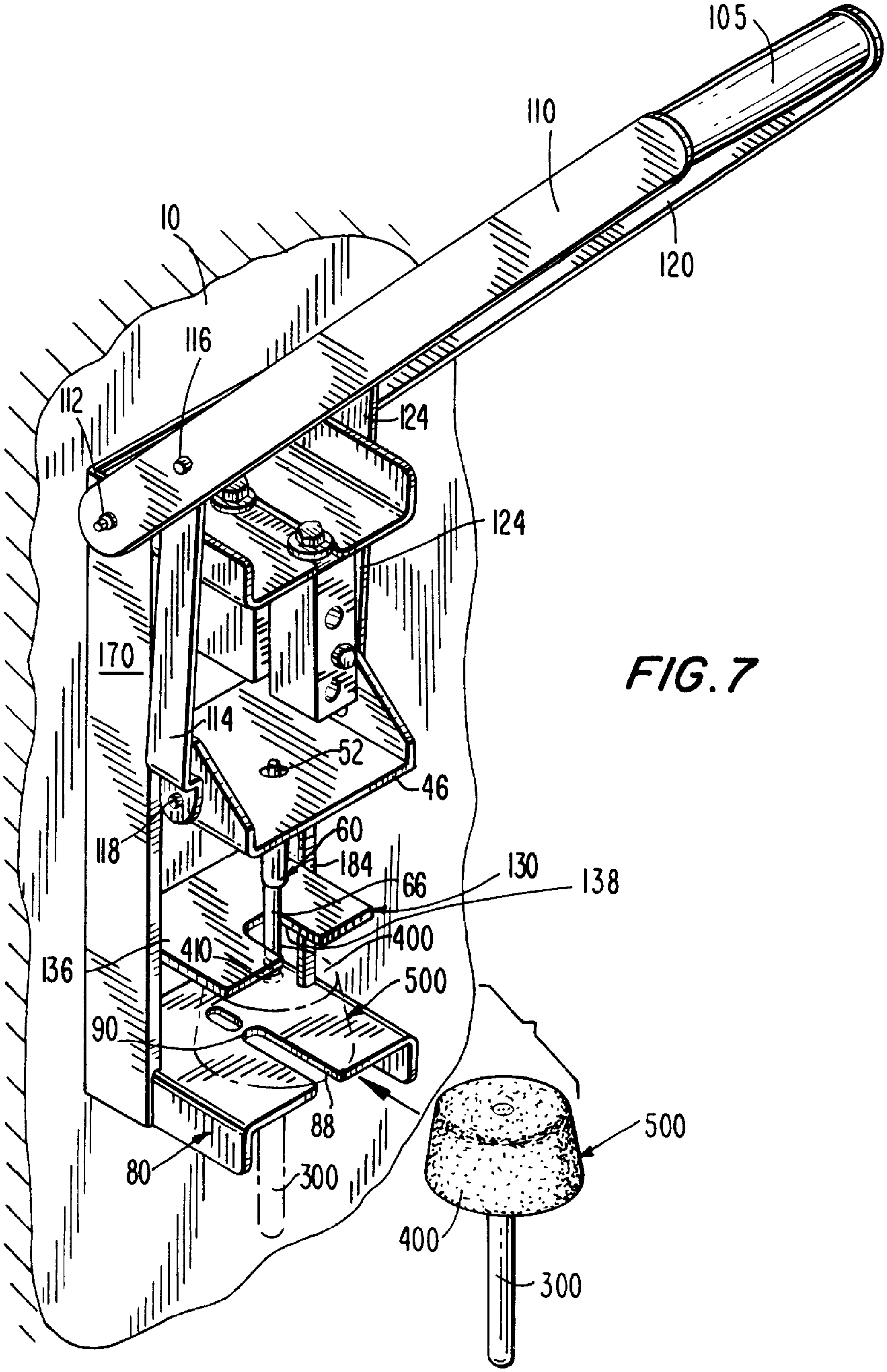
FIG. 7 is a perspective view of a sipper tube insertion and removal apparatus according to the present invention positioned to accept a sipper tube and stopper assembly for removing the sipper tube from the stopper.
Figure 8:
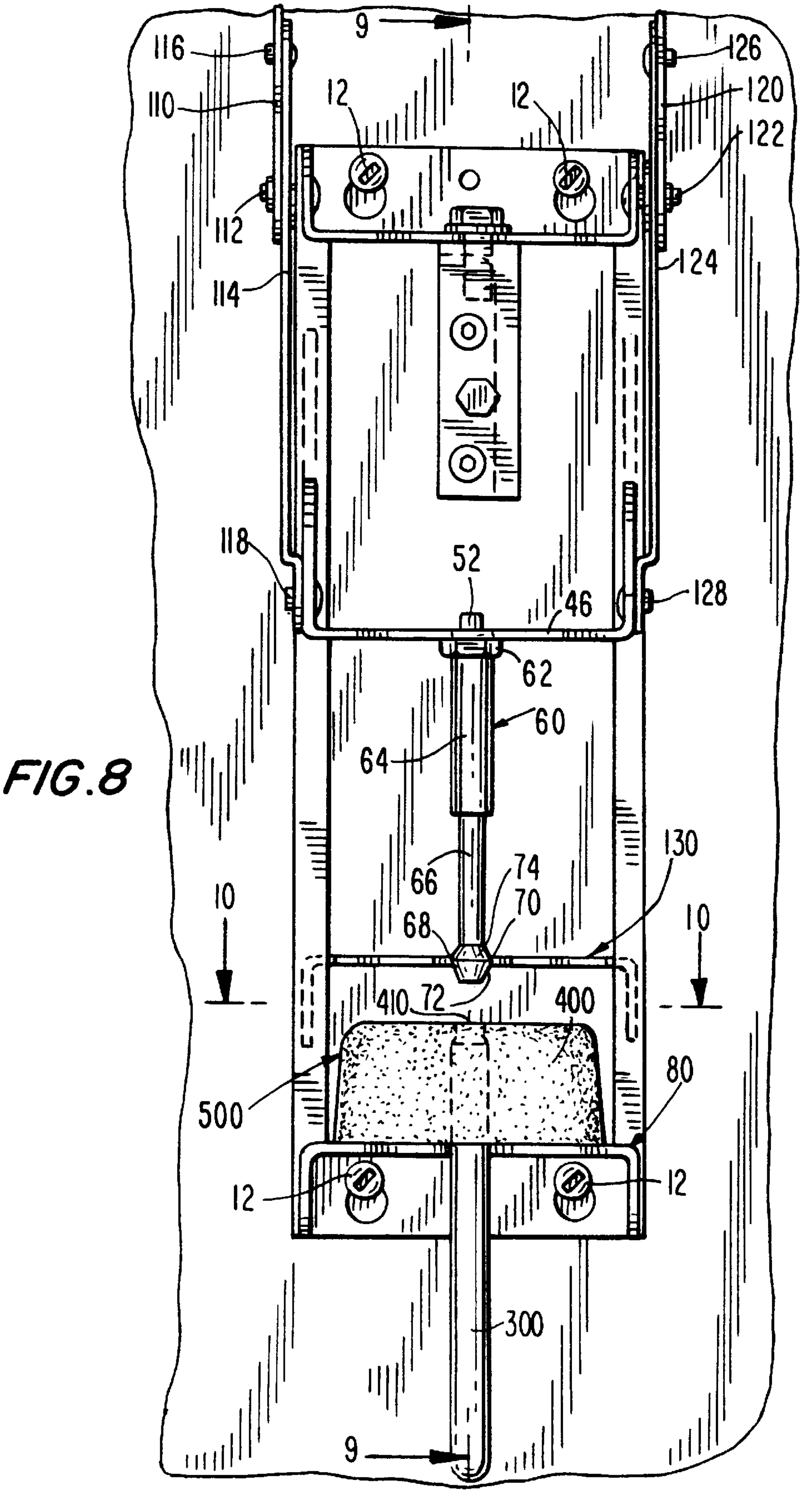
FIG. 8 is a front elevational view of a sipper tube insertion and removal apparatus according to the present invention positioned to accept a sipper tube and stopper assembly for removing the sipper tube from the stopper.
Figure 9:
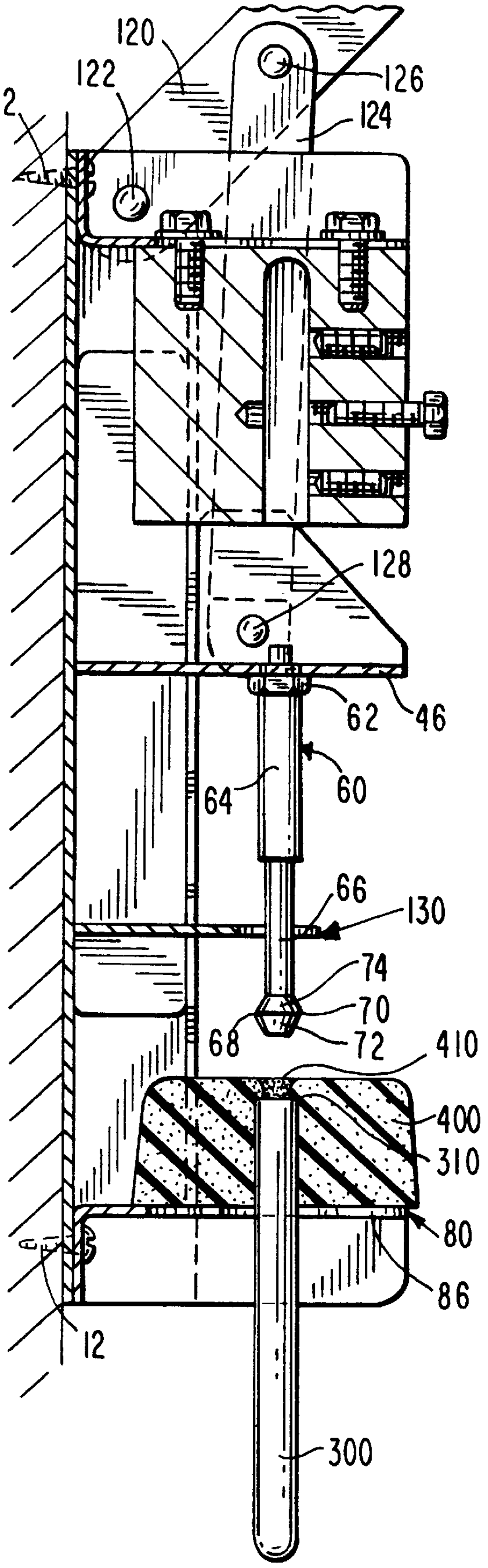
FIG. 9 is a sectional view taken along the line 9—9 of FIG. 8.
Figure 10:
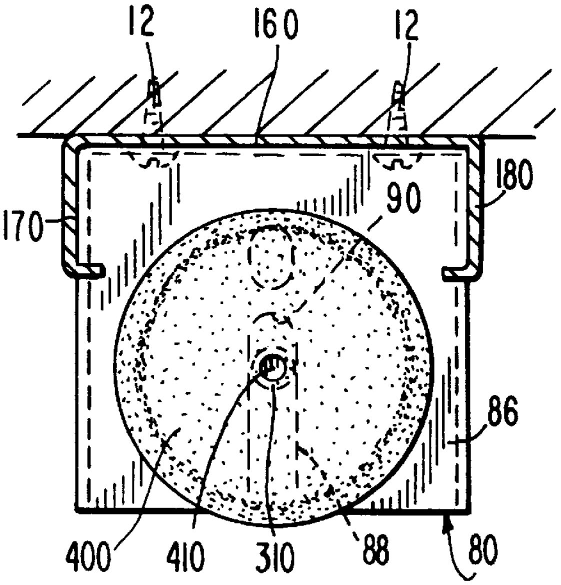
FIG. 10 is a sectional view taken along the line 10—10 of FIG. 8.
Figure 11:
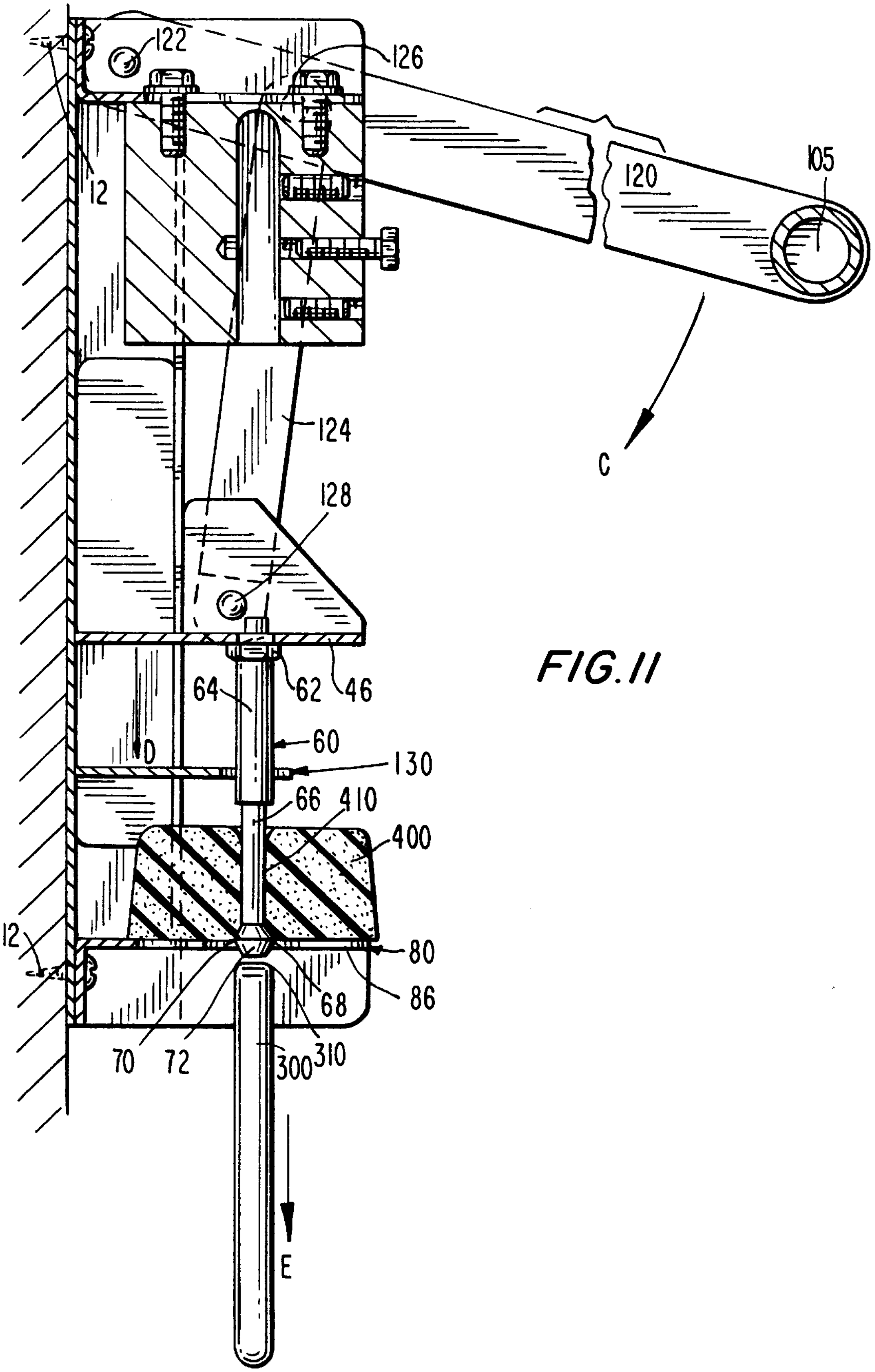
FIG. 11 is a sectional view taken along the line 9—9 of FIG. 8 showing removal of a sipper tube from a stopper in accordance with the invention.

To remove a sipper tube 300 from a hole 410 in a stopper 400, handle 105 of actuator 100 is raised as shown in FIG. 7 so as to lift sipper tube removal bit 60 to a position which provides clearance for a sipper tube and stopper assembly 500 to be placed on stopper removal platform 80. Sipper tube and stopper assembly 500 is placed on base 86 of stopper removal platform 80 as shown in FIGS. 7–11. Sipper tube and stopper assembly 500 is moved until sipper tube 300 abuts end 90 of slot 88 aligning hole 410 of stopper 400, and thus sipper tube 300 as well, with tip 68 of sipper tube removal bit 60. Stopper 400 thus rests atop base 86 while sipper tube 300 extends through slot 88 in base 86 so as to hang freely beneath stopper removal platform 80. Next, as shown in FIG. 11, handle 105 of actuator 100 is lowered and pushed inward in the direction of arrow C (FIG. 11) towards frame 150, lowering platform 40 and thus sipper tube removal bit 60 in the direction of arrow D (FIG. 11) toward sipper tube and stopper assembly 500 with enhanced leverage. As handle 105 of actuator 100 is lowered, tip 68 of sipper tube removal bit 60 is inserted into hole 410 of stopper 400. As sipper tube removal bit 60 is further lowered, flare 70 of tip 68 contacts end 310 of sipper tube 300 and pushes sipper tube 300 downward through hole 410 of stopper 400 as well as through slot 88 of stopper removal platform 80. Handle 105 of actuator 100 is lowered until sipper tube 300 has been fully ejected from stopper 400 in the direction of arrow E (FIG. 11) where it falls into a bucket or other receptacle.

After sipper tube 300 has been removed from stopper 400, stopper 400 is released from sipper tube removal bit 60 by raising handle 105 (away from frame 150). Specifically, when sipper tube 300 has been removed, tip 68 of sipper tube removal bit 60 has been pushed through the entire length of hole 410 as shown in FIG. 11. Because flare 70 must be sufficiently wide to contact end 310 of sipper tube 300 without passing therethrough, the diameter of flare 70 may be greater than the inside diameter of hole 410 which may consequently prevent stopper 400 from being released from sipper tube removal bit 60 without some force. Accordingly, stopper release plate 130 is provided above stopper 400 so that when handle 105 of actuator 100 is raised to lift sipper removal bit 60, stopper release plate 130 holds stopper 400 in place while sipper tube removal bit 60 is easily lifted upwards and out of hole 410 using the leverage of actuator 100. As noted above, neck 66 of sipper tube removal bit 60 is preferably narrower in width than hole 410 of stopper 400. This ensures that stopper 400 exerts force only on flare 70 and not on a significant length of sipper tube removal bit 60, thereby facilitating release of stopper 400.

It should be noted that various modifications may be made to the invention without departing from the scope or spirit of the invention herein described. For example, it is envisioned that frame 150 could also be mounted to a horizontal or otherwise aligned surface. In addition, actuator 100 could be motorized and operated by means of a switch or a computer to automatically insert and remove stoppers in rapid succession. Furthermore, a bin could be mounted beneath sipper tube and insertion apparatus 200 when mounted vertically to collect removed sipper tubes. Likewise, another bin could be provided behind and beneath sipper tube insertion and removal apparatus 200 and a hole could be provided in back panel 60 between stopper removal platform 80 and stopper release plate 130. In this configuration, once a sipper tube has been removed, the next stopper with a sipper tube could be pushed into position on stopper platform 80 while the stopper whose sipper tube has just been removed would be pushed rearward through the hole in back panel 160 and into the bin. Such a configuration allows sipper tubes to be removed from stoppers in rapid succession while collecting separated sipper tubes and stoppers in separate containers.

By providing a sipper tube insertion and removal apparatus which inserts and removes sipper tubes from stoppers using the enhanced leverage of an actuator and consistency in alignment between the various elements as described above, sipper tubes may be easily, safely and consistently inserted into the holes of stoppers without significant manual force and without the ergonomic risks of muscle strain, cuts and bruises occasioned by unsuccessfully attempting to force a misaligned sipper tube into a stopper, and carpal tunnel syndrome caused by repetitive insertion and removal.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A sipper tube insertion and removal apparatus for inserting a sipper tube into a stopper with a hole and for removing a sipper tube from a stopper with a hole, comprising:

a sipper tube insertion head for holding the sipper tube;

a stopper insertion platform for holding the stopper such that the hole of the stopper may be aligned with the sipper tube, the stopper insertion platform being disposed at a first predetermined distance apart from the sipper tube insertion head;

an actuator for closing the predetermined distance between the sipper tube insertion head and the stopper insertion platform so as to cause the sipper tube to be inserted into the hole of the stopper;

a sipper tube removal bit; and a stopper removal platform for holding the stopper with the sipper tube inserted in the hole of the stopper, the stopper removal platform being disposed at a second predetermined distance apart from the sipper tube removal bit, said actuator closing the predetermined distance between the sipper tube removal bit and the stopper removal platform so as to drive the sipper tube removal bit into the hole of the stopper to thereby push the sipper tube out of the hole of the stopper.

2. The sipper tube insertion and removal apparatus of claim 1, wherein the sipper tube insertion head further includes a groove for holding the sipper tube.

3. The sipper tube insertion and removal apparatus of claim 1, wherein the sipper tube insertion head further includes sipper tube length adjuster holes for accommodating sipper tubes of various lengths.

4. The sipper tube insertion and removal apparatus of claim 1, wherein the stopper insertion platform further includes a stopper alignment nib for aligning the hole of the stopper with the sipper tube held by the sipper tube insertion head.

5. The sipper tube insertion and removal apparatus of claim 1, wherein the sipper tube removal bit further includes a head for engaging an end of the sipper tube, said head further including a flare, and said flare being unable to pass into the end of the sipper tube when the head of the sipper tube removal bit is inserted into said end of the sipper tube.

6. The sipper tube insertion and removal apparatus of claim 5, wherein the flare is conical.

7. The sipper tube insertion and removal apparatus of claim 1, wherein the sipper tube removal bit is mounted to said stopper insertion platform.

8. The sipper tube insertion and removal apparatus of claim 1, wherein the stopper removal platform is provided with a slot for receiving the sipper tube and for passing the sipper tube therethrough.

9. The sipper tube insertion and removal apparatus of claim 8, wherein the slot aligns the sipper tube with the sipper tube removal bit when the sipper tube is received in the slot.

10. The sipper tube insertion and removal apparatus of claim 1, further including a frame, and wherein the sipper tube insertion head and the sipper tube removal platform are mounted to the frame.

11. The sipper tube insertion and removal apparatus of claim 10, wherein the stopper insertion platform is slidably disposed on the frame so that the actuator causes the stopper insertion platform to slide toward the sipper tube insertion head to close the gap therebetween.

12. The sipper tube insertion and removal apparatus of claim 11, wherein the sipper tube removal bit is mounted to said stopper insertion platform.

13. The sipper tube insertion and removal apparatus of claim 10, wherein the actuator further includes a first lever member and a second lever member, said first lever member and said second lever member each being pivotably mounted to said frame, and wherein the actuator further includes a first pivoting strut and a second pivoting strut, said first pivoting strut being pivotably coupled to said first lever member, said second pivoting strut being pivotably coupled to said second lever member, and said first pivoting strut and said second pivoting strut each being pivotably coupled to said stopper insertion platform.

14. The sipper tube insertion and removal apparatus of claim 13, wherein the actuator further includes a handle, said handle joining said first lever member and said second lever member.

15. The sipper tube insertion and removal apparatus of claim 10, wherein the actuator further includes a first lever member and a second lever member, said first lever member and said second lever member each being pivotably mounted to said frame, and wherein the actuator further includes a first pivoting strut and a second pivoting strut, said first pivoting strut being pivotably coupled to said first lever member, said second pivoting strut being pivotably coupled to said second lever member, and said first pivoting strut and said second pivoting strut each being pivotably coupled to said sipper tube removal bit.

16. The sipper tube insertion and removal apparatus of claim 15, wherein the actuator further includes a handle, said handle joining said first lever member and said second lever member.

17. The sipper tube insertion and removal apparatus of claim 1, further including a stopper release plate for releasing a stopper from the sipper tube removal bit.

18. The sipper tube insertion and removal apparatus of claim 17, wherein said stopper release plate is provided between the stopper removal platform and the sipper tube removal bit when the sipper tube removal bit is disposed at said second predetermined distance from the stopper removal platform.

19. The sipper tube insertion and removal apparatus of claim 17, wherein said stopper release plate is provided with a hole for passing the sipper tube removal bit therethrough.

20. A sipper tube insertion apparatus for inserting a sipper tube into a stopper with a hole, comprising:

a sipper tube insertion head for holding the sipper tube;

a stopper insertion platform for holding the stopper such that the hole of the stopper may be aligned with the sipper tube, the stopper insertion platform being disposed at a predetermined distance apart from the sipper tube insertion head;

an actuator for closing the predetermined distance between the sipper tube insertion head and the stopper insertion platform so as to cause the sipper tube to be inserted into the hole of the stopper; and the sipper tube insertion head further including a groove for holding the sipper tube.

21. A sipper tube insertion apparatus for inserting a sipper tube into a stopper with a hole, comprising:

a sipper tube insertion head for holding the sipper tube;

a stopper insertion platform for holding the stopper such that the hole of the stopper may be aligned with the sipper tube, the stopper insertion platform being disposed at a predetermined distance apart from the sipper tube insertion head;

an actuator for closing the predetermined distance between the sipper tube insertion head and the stopper insertion platform so as to cause the sipper tube to be inserted into the hole of the stopper; and the sipper tube insertion head further including sipper tube length adjuster holes for accommodating sipper tubes of various lengths.

22. A sipper tube insertion apparatus for inserting a sipper tube into a stopper with a hole, comprising:

a sipper tube insertion head for holding the sipper tube;

a stopper insertion platform for holding the stopper such that the hole of the stopper may be aligned with the sipper tube, the stopper insertion platform being disposed at a predetermined distance apart from the sipper tube insertion head;

an actuator for closing the predetermined distance between the sipper tube insertion head and the stopper insertion platform so as to cause the sipper tube to be inserted into the hole of the stopper; and the stopper insertion platform further including a stopper alignment nib for aligning the hole of the stopper with the sipper tube held by the sipper tube insertion head.

23. A sipper tube insertion apparatus for inserting a sipper tube into a stopper with a hole, comprising:

a sipper tube insertion head for holding the sipper tube;

a stopper insertion platform for holding the stopper such that the hole of the stopper may be aligned with the sipper tube the stopper insertion platform being disposed at a predetermined distance apart from the sipper tube insertion head;

an actuator for closing the predetermined distance between the sipper tube insertion head and the stopper insertion platform so as to cause the sipper tube to be inserted into the hole of the stopper;

a frame, and wherein the sipper tube insertion head and the stopper insertion platform are disposed on the frame; and the stopper insertion platform being slidably disposed on the frame so that the actuator causes the stopper insertion platform to slide toward the sipper tube insertion head to close the gap therebetween.

24. A sipper tube insertion apparatus for inserting a sipper tube into a stopper with a hole comprising:

a sipper tube insertion head for holding the sipper tube;

a stopper insertion platform for holding the stopper such that the hole of the stopper may be aligned with the sipper tube, the stopper insertion platform being disposed at a predetermined distance apart from the sipper tube insertion head;

an actuator for closing the predetermined distance between the sipper tube insertion head and the stopper insertion platform so as to cause the sipper tube to be inserted into the hole of the stopper;

a frame, and wherein the sipper tube insertion head and the stopper insertion platform are disposed on the frame; and the actuator further including a first lever member and a second lever member, said first lever member and said second lever member each being pivotably mounted to said frame, and wherein the actuator further includes a first pivoting strut and a second pivoting strut, said first pivoting strut being pivotably coupled to said first lever member, said second pivoting strut being pivotably coupled to said second lever member, and said first pivoting strut and said second pivoting strut each being pivotably coupled to said stopper insertion platform.

25. The sipper tube insertion apparatus of claim 24, wherein the actuator further includes a handle, said handle joining said first lever member and said second lever member.

26. A sipper tube removal apparatus for removing a sipper tube from a stopper with a hole, comprising:

a sipper tube removal bit;

a stopper removal platform for holding the stopper with the sipper tube inserted in the hole of the stopper the stopper removal platform being disposed at a predetermined distance apart from the sipper tube removal bit;

an actuator for closing the predetermined distance between the sipper tube removal bit and the stopper removal platform so as to drive the sipper tube removal bit into the hole of the stopper to thereby push the sipper tube out of the hole of the stopper; and the sipper tube removal bit further including a head for engaging an end of the sipper tube, said head further including a flare, and said flare being unable to pass into the end of the sipper tube when the head of the sipper tube removal bit is inserted into said end of the sipper tube.

27. The sipper tube removal apparatus of claim 26, wherein the flare is conical.

28. A sipper tube removal apparatus for removing a sipper tube from a stopper with a hole, comprising:

a sipper tube removal bit;

a stopper removal platform for holding the stopper with the sipper tube inserted in the hole of the stopper, the stopper removal platform being disposed at a predetermined distance apart from the sipper tube removal bit; and an actuator for closing the predetermined distance between the sipper tube removal bit and the stopper removal platform so as to drive the sipper tube removal bit into the hole of the stopper to thereby push the sipper tube out of the hole of the stopper;

further including a frame and wherein the sipper tube removal bit and the stopper removal platform are disposed on the frame; and the actuator further including a first lever member and a second lever member, said first lever member and said second lever member each being pivotably mounted to said frame, and wherein the actuator further includes a first pivoting strut and a second pivoting strut, said first pivoting strut being pivotably coupled to said first lever member, said second pivoting strut being pivotably coupled to said second lever member, and said first pivoting strut and said second pivoting strut each being pivotably coupled to said sipper tube removal bit.

29. The sipper tube removal apparatus of claim 28, wherein the actuator further includes a handle, said handle joining said first lever member and said second lever member.

30. A sipper tube removal apparatus for removing a sipper tube from a stopper with a hole, comprising:

a sipper tube removal bit;

a stopper removal platform for holding the stopper with the sipper tube inserted in the hole of the stopper, the stopper removal platform being disposed at a predetermined distance apart from the sipper tube removal bit;

an actuator for closing the predetermined distance between the sipper tube removal bit and the stopper removal platform so as to drive the sipper tube removal bit into the hole of the stopper to thereby push thc sipper tube out of the hole of the stopper; and a stopper release plate for releasing a stopper from the sipper tube removal bit.

31. The sipper tube removal apparatus of claim 30, wherein said stopper release plate is provided between the stopper removal platform and the sipper tube removal bit when the sipper tube removal bit is disposed at said second predetermined distance from the stopper removal platform.

32. The sipper tube removal apparatus of claim 15, wherein said stopper release plate is provided with a hole for passing the sipper tube removal bit therethrough.

* * * * *